United States Patent [19]
Royer

[11] Patent Number: 6,041,596
[45] Date of Patent: Mar. 28, 2000

[54] BUILDING STRUCTURE FOR UTILIZATION OF WIND POWER

[76] Inventor: George R. Royer, 2137 Ragan Woods Dr., Toledo, Ohio 43614

[21] Appl. No.: 09/046,928

[22] Filed: Mar. 23, 1998

[51] Int. Cl.⁷ .................................................. F16D 31/02
[52] U.S. Cl. .............................. 60/398; 415/4.3; 415/4.5; 290/44; 290/55
[58] Field of Search .............................. 60/398; 415/4.3, 415/4.5, 908; 290/44, 55

[56] References Cited

U.S. PATENT DOCUMENTS

| | | | |
|---|---|---|---|
| 969,587 | 9/1910 | Willeams | 415/4.3 |
| 2,330,907 | 10/1943 | Odor et al. | 415/4.3 X |
| 4,321,476 | 3/1982 | Buels | 415/4.3 X |
| 4,482,290 | 11/1984 | Foreman et al. | 415/908 X |
| 5,394,016 | 2/1995 | Hickey | 290/44 X |

FOREIGN PATENT DOCUMENTS 3844376  7/1990  Germany ................................. 290/55

*Primary Examiner*—Hoang Nguyen

[57] ABSTRACT

The subject invention is an improved building structure used for residential or other purposes, and structured to utilize wind power to an optimal extent for auxiliary power purposes, such building comprising basically a building structure that has a tunnel-like opening in a portion thereof, which tunnel is adapted to contain a wind sensitive generator therein, and wherein the building has portions of the building flanking both sides of the ingress end of said wind tunnel.

9 Claims, 2 Drawing Sheets

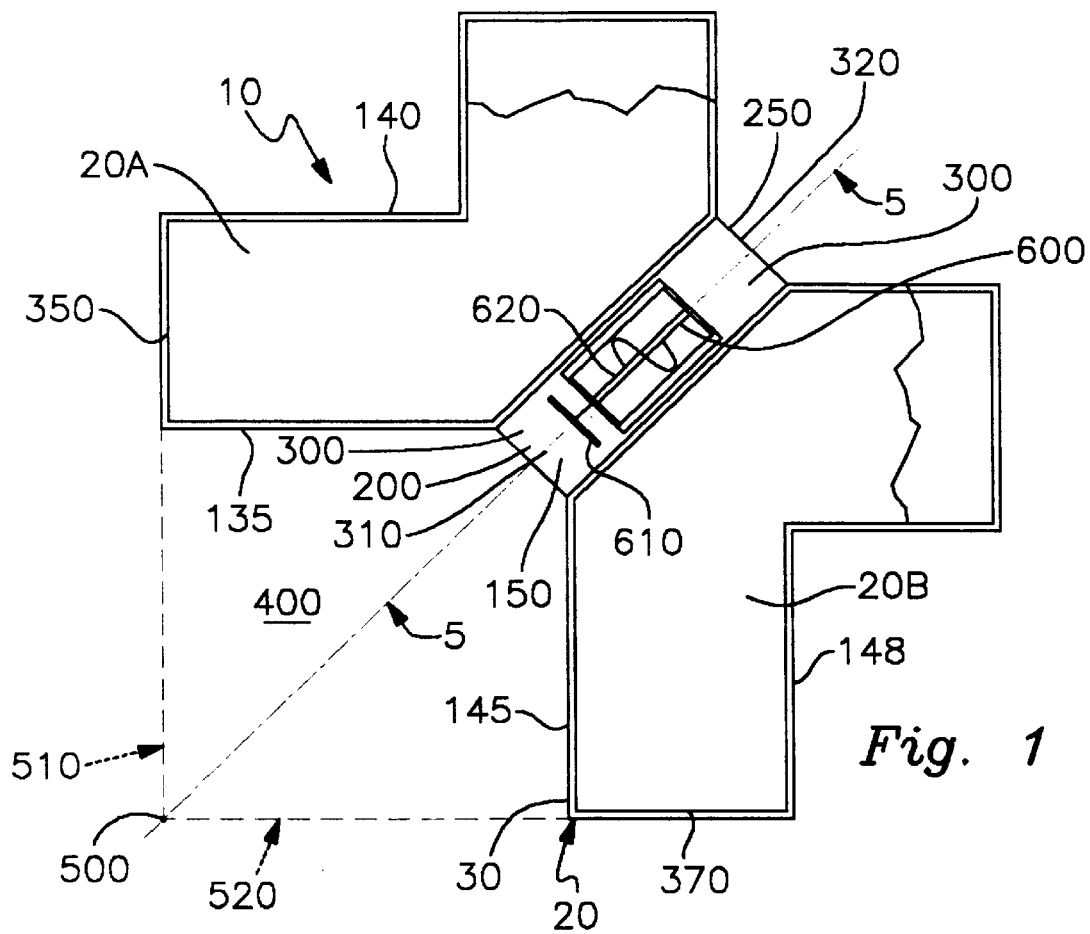
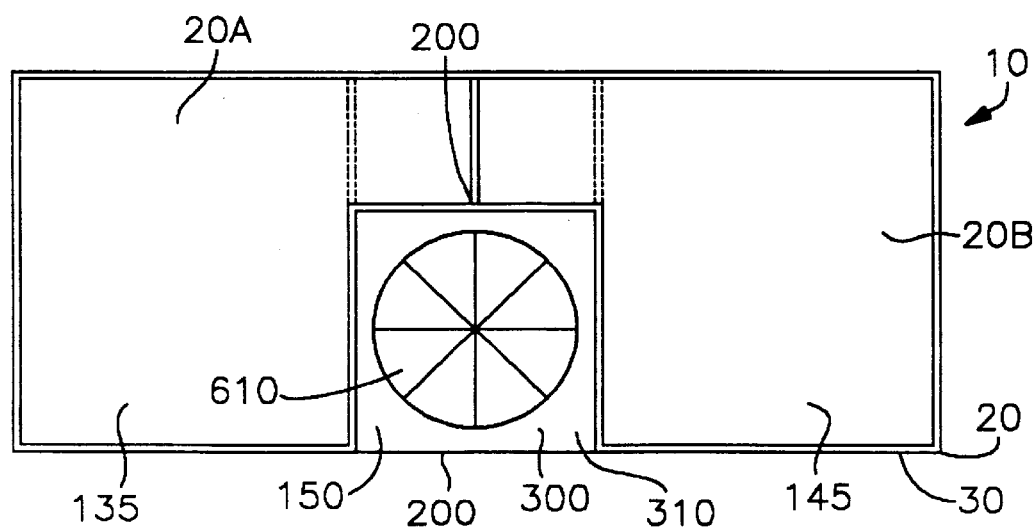

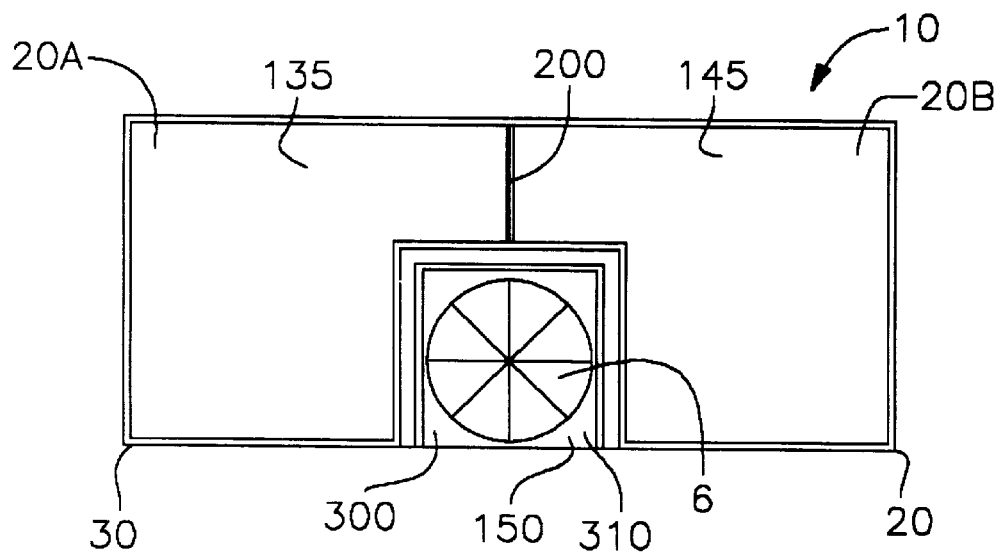
Fig. 3
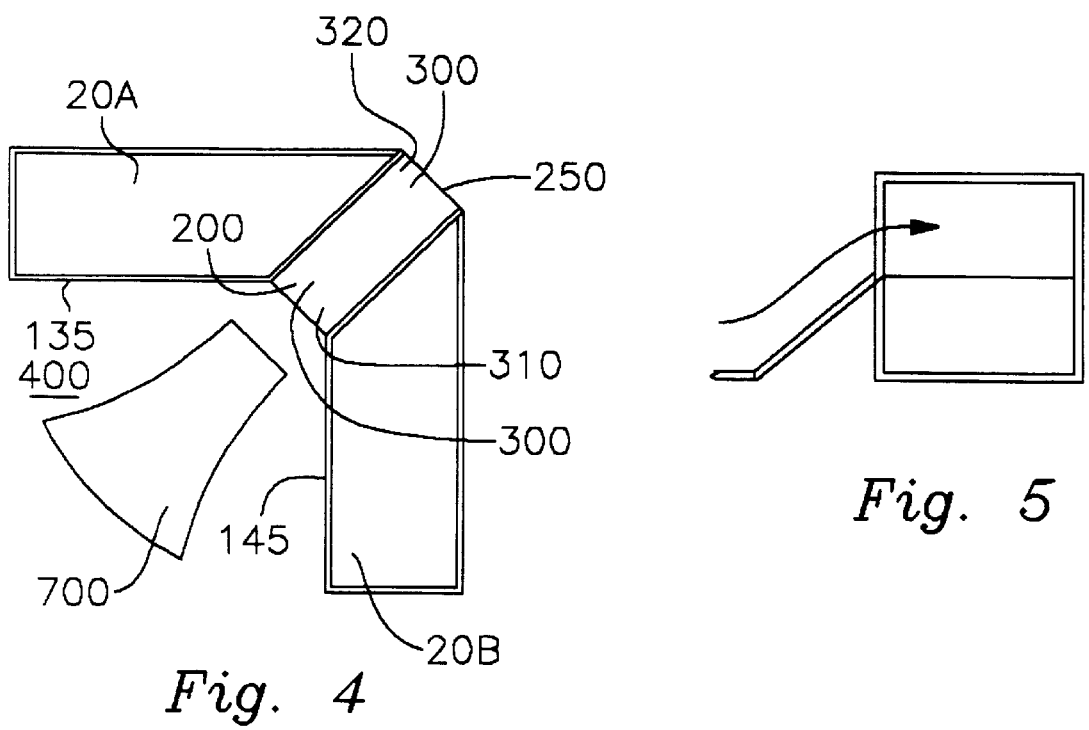
Fig. 4
Fig. 5

BUILDING STRUCTURE FOR UTILIZATION OF WIND POWER

DISCUSSION OF PRIOR ART AND BACKGROUND OF THE INVENTION

The subject invention is a novel building structure adapted to maximize the harnessing and utilization of wind power so as to provide a power source for the building. As such, the invention herein applies to any general type of building structures that are constructed to use power sources therein in conjunction with the building activities.

It is to be noted that known structures that have wind-powered generators constructed as an integral part of such building are not new. Examples of such structures are windmills, and other such similar structures. Other building structures incorporating windmills or wind-powered generators have been known in this regard and windmill or wind-powered apparatus in conjunction with a building structure are not considered new.

One of the main problems in this respect is that known existing building structures that incorporate wind-powered devices do not make maximum use of windflow volume as enhanced by the building structure itself. More particularly, no known building structures exist to use the building structure itself to both vector and channel windflow volume from a given wind input to a more concentrated windflow.

Thus, no known building structures are presently structured that serve to first vector windflow into one area of the building and thence funnel the windflow into a relatively narrowed corridor where the concentrated flow air can be harnessed by a wind-powered generator. No known structure incorporates and integrates with building structures has been seen or utilized in this regard. Accordingly, the invention herein is directed to this end and the following objects are directed accordingly.

OBJECTS

The following are objects of the subject invention:

It is an object of the subject invention to provide an improved building structure to maximize the usage of wind power;

It is also an object of the subject invention to provide an improved wind-powered generator structure;

Another object of this invention is to provide an improved building structure to maximize the usage of wind power;

Still another object of the subject invention is to provide an improved building that incorporates integrated structures to maximize wind power usage;

Yet another object of this invention is to provide an improved vectoring device in a building structure for conversion of wind into a relatively narrowed corridor to use wind power in such corridor;

Another object of this invention is to provide an improved building structure for energy efficiency purposes.

Other and further objects of the subject invention will become apparent from a reading of the following description taken in conjunction with the drawings and claims.

DRAWINGS

FIG. 1 is a top elevational view of the subject building structure shown in cross-section;

FIG. 2 is a frontal elevational view of the subject building structure,

FIG. 3 is a side elevational view of the tunnel mechanism used in conjunction with the subject building:

FIG. 4 is a top elevational view of an alternate.

FIG. 5 is a side view of another embodiment.

DESCRIPTION OF GENERAL EMBODIMENT OF INVENTION

The subject invention is an improved building structure for residential or other purposes, and structured to utilize wind power to an optimal extent for auxiliary purposes, such building comprising generally a building structure that has two portions or units that have a tunnel-like opening at the juncture of the two units, such tunnel being adapted to hold a wind sensitive generator. Alternately, the building may comprise a singular building unit having a wind tunnel structured inside of the building.

The subject invention is an improved building structure used for residential or other purposes, and structured to utilize wind power to an optimal extent for auxiliary power purposes, such building comprising basically a building structure that has a tunnel-like opening in a portion thereof, which tunnel is adapted to contain a wind sensitive generator therein, and wherein the building has portions of the building flanking both sides of the ingress end of said wind tunnel.

DESCRIPTION OF PREFERRED EMBODIMENT OF THE INVENTION

Referring now to the drawings in which a preferred embodiment of the subject invention is shown, it is to be noted that the subject invention as described is only one embodiment within the scope of this application, and that other embodiments are envisioned to fall within the scope of this invention. Therefore, the following description of such one preferred embodiment of the subject invention is not to be construed as limiting the scope of the inveniton herein, as set forth in the claims herein.

Attention is directed to FIGS. 1 and 2 of the drawings, in which a preferred embodiment of the subject invention is shown. Shown in FIG. 1 is a base building structure, as shown from an upper elevational or upper planar view showing the general planar outline of the building structure and building substructures, comprising the basic building structure herein. In this regard, building structure 10 is adapted to be integrally connected to a foundation 20 affixed in the ground 30 in an appropriate manner. The building structure need not be affixed to the ground, or through a foundation, and it is to be noted that the structural configuration of the subject building can be other than as set forth in the drawings except as stated below.

As can be seen from the drawings, the building 10 is essentially shown from an upper planar view if looking down on the building from above, and in the view shown, it is a cross-sectional view at an intermediate height level of such building. As shown, the building 10, from such upper planar view, is shown as being an L-shaped structure or a V-shaped structure, as seen from such upper planar view. For purposes of this invention, it is not necessary that the building structure be of any particularized shape or structure, as viewed from any angle, so long as there is some wind tunnel arrangement as discussed below, which wind tunnel is flanked by portions of the building on both sides of the ingress end of such tunnel.

More specifically, as seen from such planar view, the building 10 in the preferred embodiment is thusly comprised of two wing portions, one wing designated as first wing 20A and the other wing portion being referred to as second wing portion 20B. As can be seen in the drawings, first wing portion 20A is disposed substantially perpendicular in relationship to the second wing portion 20B, as seen from such upper elevational view. The first wing portion 20A has a first outer face 135 and a second face 140, while the second wing portion 20B has a first outer face 145 and a second outer face 148. The first outer face 135 of the first wing portion 20A meets the first outer face 145 of the second wing member 20B in a generally perpendicular manner at first corner portion 200, as seen in FIG. 1.

The area or portions where first wing section 20A meets the second wing portion 20B is referred to as the middle zone 150. More particularly, the first wing 20A joins the second wing portion 20B at the middle zone 150. The middle zone portion 150 is essentially a building portion that extends at an angle from the building corner portion 200 towards a portion, shown as portion 250, being the joinder portion of outer face 120 of the first wing portion and outer face 148 of the second wing portion.

As an alternate method of describing the two portions of the building 10 is as follows: Building 10 has an intermediate portion 150 that is flanked by two other building portions 20A and 20B. Building portions 20A and 20B can be of any size or structure, and need not be of any particular shape, size, construction and such two portions need not be identical. The most vital aspect of this building concept is to have a building structure that incorporates an open-tunnel-like area, however brief, into which tunnel wind can can be directed for the purposes discussed.

At this middle portion 150 where the two portions meet, in the preferred embodiment of the subject invention there is a tunnel-like opening 300 that extends longitudinally substantially and generally from first corner portion 200 through to a second corner portion 250, said tunnel being generally, but not necessarily, in the middle portion. Also, is noted that the tunnel need not be in the middle but at any part of the building.

As thusly seen, tunnel portion 300 has a first or ingress opening 310 to such tunnel, located at or about first corner portion 200 and a second or exit opening 320 at or about corner portion 250. It is to be stressed in this regard that the ingress tunnel opening 310 and the egress tunnel opening can be of any general configuration and the tunnel may be of any general configuration so long as it is longitudinally continuous from the ingress opening to the egress opening. Moreover, the first opening is preferably located in a position which faces the general oncoming wind direction. In this latter respect, the location of the tunnel is preferably along an axis A—A being the longitudinal central axis of the tunnel portion 300 wherein such longitudinal axis A—A is preferably in general and substantial alignment with the prevailing wind direction impinging on the building 100 over a period of time. This is not critical, however.

As can be seen from the drawings, and particularly the planar view of FIG. 1, it can be observed that the spatial area 400 between the first wind 20A and second wing 20B is flanked by first wing face 135 and second wing face 140. This latter spatial area 400 between faces 135 and 145 is an open area that ideally, but not necessarily, extends outwardly to a spatial zone that at least extends to an imaginary point 500 defined as the intersection of imaginary lines extending respectively along and as imaginary extensions of the end faces 350 and 370 respectively disposed on the end of the wings 100 and 150. This is not critical to the subject invention, and not part of physical attributes of the subject invention but only a result of the physical attributes of the subject invention.

The spatial area is as stated of no critical import or part of the subject invention, but is shown to demonstrate graphically that the subject building structure 10 contemplates a resultant spatial area flanked in some angular relationship by portions of the building structure so that a V-shaped area or other angular relationship is formed between parts of the building with such V-shaped or other spatial area so formed being structurally adapted to funnel oncoming wind to the tunnel area 300 preferably located at the apex or corner of such V-shaped or other spatial area. This latter relationship will ideally funnel oncoming wind flowing towards the building 10 through this spatial area 400 towards an increasingly, more restricted spatial area as wind approaches the wind tunnel 300, thereby increasing with the volume and velocity of the wind as it approaches the ingress opening 310 of wind tunnel 300. This, in turn, will provide a more maximal wind flow over wind turbine 600, with the rotor 610 receiving the impact of this increased wind volume and velocity.

Referring now to FIG. 1, in which is shown a relatively enlarged view of the tunnel member 300. There is affixed in some appropriate fashion a wind-powered generator 600 shown schematically as being disposed with a wind-propelled rotor 610, fixedly mounted in a concentric manner to rotatable cylindrical shaft 620. The wind-driven generator may be integrally affixed to a device, such as a generator, in which to generate electricity or transfer the motive power of the wind generator to the power source. It is to be stressed that the subject invention may have alternate forms to those discussed above. Thus, as can be seen from the drawings, the wind-driven generator in the tunnel is disposed in a longitudinally disposed manner along axis A—A of the tunnel so as to receive any wind currents flowing longitudinally along such tunnel from the ingress opening 310 to the egress opening 320.

In one alternate embodiment of the subject invention, as shown in FIG. 4, a windscoop or extra wind tunnel 700 is deposed in or near the spatial area 400 to help further facilitate the funnelling of wind towards the wind tunnel 300. This windscoop 400 has a front opening 710 that leads to an internal passageway 720 passing from front opening 710 to a posterior opening 730 that ejects the wind towards the wind tunnel 300 in building 10. For this purpose the internal passageway 710 becomes increasingly narrowed or restricted in size as it extends from front opening 710 to posterior opening 730, thereby creating a bernoulli effect for the wind flow as it passes through the passageway 720. It is noted that this bernoulli effect, that is the increasingly restricted flow of wind as it passes towards tunnel 300, is basically accomplished by the flanking wing members 20A and 20B of building structure 10 or comparable building characteristics of building structure 10.

In summary, the subject invention is a building structure 10 adapted to utilize wind impinging against such building to use such wind for power purposes, such building structure 10 comprising a building having a windward face and a downwind face, such building having a tunnel member 300 extending completely through such building, and further comprising wind turbine means disposed in such tunnel 300 to receive wind to drive such turbine.

In further summary, the subject invention is a building complex 10 adapted to utilize wind means to supplement its energy needs, such building complex 10 comprising a building member 10 having a front portion and a posterior portion with such building member 10 having a longitudinally extending opening 300 extending from the front portion of the building through to the second portion for passage of air flow received against the front portion to be passed through such building member 10 beyond the second portion of such building member, and further comprising wind turbine means 600 affixed in said longitudinally extending opening 300 in such building member 10, and further comprising wind funneling means affixed to such building member 10 to funnel wind flow received against the front portion of such building member 10 into such longitudinally extending opening 300 in such building member 10.

Yet another summary of the subject invention is a building complex 10 adapted to utilize wind sources for energy purposes, comprising a plurality of building structures, each building having a horizontally extending longitudinal extent, each such building structure having a first end and a second end, each such first end and second end defining the longitudinal extent of each such building structure, with the first ends of each such building structure being juxtaposed adjacent to one another with an open space separating such respective first ends of said building structures, and further comprising wind generator means 300 disposed in the open space 400 between the respective first ends of such building structures.

Further summary of the subject invention centers on a building structure 10 affixed to the earth adapted for utilizing wind movements from a windward direction to a leeward direction of such building with such wind movements impinging on such building structure 10 to be utilized to provide energy needs, such building structure 10 comprising a structure having a substantially upright first outer wall surface and a substantially upright second outer wall surface with such first outer wall surface facing towards the windward flow of wind and the second outer wall surface facing the leeward side of the windward flow of the wind, and further comprising wind tunnel means 300 in said building 10, such wind tunnel means extending completely through such building from the first outer surface to the second outer surface of such building.

Still another summary of the subject invention is a building structure 10 adapted to utilize wind impinging against a building 10 to use such wind for power purposes, such building structure 10 comprising a building 10 having a windward face and a downward face, such building 10 having a tunnel member 300 extending completely through said building 10, and comprising wind turbine means 600 aligned in said tunnel 300 to receive wind for driving such turbine.

Still another summary of the subject invention is that it comprises a structural arrangement adapted to utilize wind movements near the earth's surface for energy purposes, comprising a structure disposed on the earth's surface, such structure having a windward side and a leeward side, such structure having an open longitudinally extending spatial area with such spatial area having a first end and a second end, with the first end being open to the wind on the windward side of the structure and the second end being open to the leeward side of the structure, whereby wind flowing towards the windward side of the structure will pass through the longitudinally extending spatial area of the structure, and further comprising a first upright and longitudinally extending structure component member affixed to such structure, with said first component member having a first end and a second end, with the first end of such first structure component being affixed adjacent to such first opening in such spatial area of such structure, and such first member having a windward surface and a leeward surface, such windward surface defining substantially an upright plane relative to the ground, and further comprising a second upright component affixed to such building structure having a front face that forms an angle of less than one hundred and eighty degrees relative to the front face of the first structure component.

Another summary of the subject wind tunnel structure adapted to receive wind movements through such wind tunnel for capturing the wind movements for energy purposes comprising a building structure attached to the ground, such building structure having a first outer wall facing the windward side of such building structure, with such first outer wall having an indented portion at the end of which is a wind tunnel 300.

Yet another summary of the subject invention is that it is a structured arrangement adapted to utilize wind movement for energy purposes comprising a building structure 10 with a first surface and an opposing second surface having a continuously extending tunnel-like spatial area extending completely from the first surface to the opposing second surface of said structure, whereby wind movements flowing against the first surface of such building structure will pass through the tunnel-like spatial area of such structure to the outside air just adjacent the opposing second surface of such structure, and further comprising wind sensitive mechanical means disposed in the spatial area of such structure, such wind sensitive means being adapted to utilize for energy purposes the wind flow through such spatial area in such structure, and also comprising upright structural means on such first surface of said structure adapted to pass wind flow against such first surface of such structure into increasingly more confined air space as wind moved towards such spatial area in such structure for such wind so confined to pass over the wind sensitive mechanical means in the spatial area of such building structure.

The subject invention can be further described as a building structure having an upright windward surface and an upright surface opposite to the windward surface, and wherein such building structure 10 has an open tunnel 300 extending completely through such building structure 10 from the windward surface to the opposing surface, and wherein a wind-driven generator is aligned in such open tunnel to receive wind flowing against the windward surface of the building structure 10 and wherein a portion of such windward surface of such building structure is disposed at an angle, from an upper elevational perspective, relative to the remaining portion of said windward surface, such angle formed from such upper elevational perspective being of less than one hundred and eighty degrees.

I claim:

1. A building structure adapted to utilize wind impinging against a building to use such wind for power purposes, such building structure comprising:
   (a) a building having a windward face and a downwind face, said building structure having a wind tunnel member extending completely through said building, said windward face having two outer wall portions that are angled relative to one another, as seen from an upper elevationa view, with said wind tunnel means being disposed in a portion of such building structure where said two outer wall portions are joined together;
   (b) wind turbine means aligned in said wind tunnel to receive wind.

2. A building complex adapted to utilize wind means to supplement its energy needs, said complex comprising:
   (a) a building member having a front portion and a posterior portion with said building member having a longitudinally extending spatial opening extending from the front portion through to the second portion for passage of air flow received against the front portion of the building member to be passed through said spatial opening in said building member beyond the second portion of said building member;

(b) wind turbine means affixed to said longitudinally extending opening in said building member, said wind turbine means adapted to capture wind flowing through said spatial opening;

(c) wind funneling means integrally affixed to said building member to funnel wind flow received against the front portion of said building member into said longitudinally extending spatial opening in said building member, said wind funneling means comprising at least two external wall members flanking the spatial opening on the front portion of said building structure with said two flanking wall members being aligned at an angle to each other as viewed from an upper elevational view.

3. A building complex adapted to utilize wind sources for energy purposes, comprising:

(a) a plurality of building structures, each having a horizontally extending longitudinal extent, each such building structure having a first end and a second end, each such first end and second end defining the longitudinal extent of each such building structure, with the first ends of each such building structure being juxtaposed adjacent to one another with an open space separating said respective first end of each of said building structures;

(b) wind generator means disposed in the open space between the respective first ends of said building structures.

4. A building structure affixed to the earth adapted for utilizing wind movements from a windward direction to a leeward direction, with such wind movements impinging on said building structure to be utilized to provide energy needs, said building structure comprising:

(a) a building structure having a substantially upright first outer wall surface and a substantially upright second outer wall surface with said first outer wall surface facing towards the windward flow of wind and the second outer wall surface facing the leeward side of the windward flow of the wind, said first outer wall being formed with an indented spatial portion as seen from an upper elevational view being positioned in front of said wind tunnel means outwardly away from the building structure with the indented spatial area decreasing in spatial area as it extends towards the wind tunnel.

5. A building structure adapted to utilize wind impinging against a building to use such wind for power purposes, such building structure comprising:

(a) a building having a windward face and a downwind face, said building having a wind tunnel member extending completely through said building, said windward face having an indented spatial area in front of said tunnel member which indented spatial area decreases in size as it extends towards said tunnel member;

(b) wind turbine means aligned in said tunnel to receive wind.

6. A structural arrangement adapted to utilize wind movements near the earth's surface for energy purposes, comprising;

(a) a structure disposed on the earth's surface, said structure having a windward side and a leeward side, said structure having an open longitudinally extending spatial area with such spatial area having a first end and a second end, with the first end being open to the wind on the windward side of the structure and the second end being open to the leeward side of the structure, whereby wind flowing towards the windward side of the structure will pass through the longitudinally extending spatial area of the structure;

(b) a first upright and longitudinally extending structure component member affixed to said structure, said first component member having a first end and a second end, with the first end of said first structure component being affixed adjacent to said first opening in said spatial area of said structure, and said first member having a windward surface and a leeward surface, said windward surface defining substantially an upright plane relative to the ground;

(c) a second upright component affixed to said structure, said second component member having a first end and a second end, with the first end of said second structure component being affixed adjacent to said first opening in said spatial area of said structure, and said second structure component having a windward surface and a leeward surface, said windward surface defining substantially an upright plane relative to the ground.

7. A wind tunnel structure in a building structure having a windward side adapted to receive wind movements through said wind tunnel for capturing the wind movements for energy conversion purposes comprising:

(a) a building structure attached to the ground, said building structure having a first outer wall with a first planar surface facing the windward side of said building structure, with said first outer wall having having a first wall inner end and an outer end first wall building structure having a second outer wall with a second planar surface also facing the windward side of said building structure with said second outer wall having a second wall outer end and a second wall inner end, said first planar surface of the first outer wall and said second planar surface of the second outer wall forming an angle between said first planar surface and said second planar surface, as viewed from a top elevational view;

(b) wind tunnel means in said building structure disposed between the first wall inner end and said second wall inner end, said wind tunnel means having an entrance opening facing the windward side of said building structure and an exist opening facing towards the opposite side.

8. A structured arrangement for a building adapted to utilize wind movement for energy purposes comprising:

(a) a building structure with a first surface and an opposing second surface having a continuously extending spatial area extending completely from the first surface to the opposing second surface of said structure, whereby wind movements flowing against the first surface of said building structure will pass through the spatial area of said structure to the outside air just adjacent the opposing second surface of said structure;

(b) wind sensitive mechanical means disposed in the spatial area of said structure, said wind sensitive means being adapted to utilize for energy purposes the wind flow through said spatial area in said structure;

(c) upright structural means integrated structurally on said first surface of said building structure, said upright structure means structurally adapted to pass wind flow against said first surface of said building structure into increasingly more confined air space as wind moves towards said continuously extending spatial area in said building structure, said upright structural means being affixed to said first surface extending away from said first surface in a direction away from said opposing surface.

9. A building structure having an upright windward surface and an upright surface opposite to the windward surface, and wherein such building structure has an open tunnel extending completely through such building structure from the windward surface to the opposing surface, and wherein a wind-driven generator is aligned in said open tunnel to receive wind flowing against the windward surface of the building structure, and wherein a portion of such windward surface has an inwardly extending spatil area as viewed from an upper elevational perspective, relative to the remaining portion of said windward surface, said inwardly extending spatial area being disposed adjacent said open tunnel, and wherein said spatial area, as viewed from an upper elevational view, decreases in size as it extends towards said open tunnel, and wherein a portion of said spatial area is exposed outwardly from said building towards the wind flow against said building structure.

* * * * *